United States Patent Office 2,820,704
Patented Jan. 21, 1958

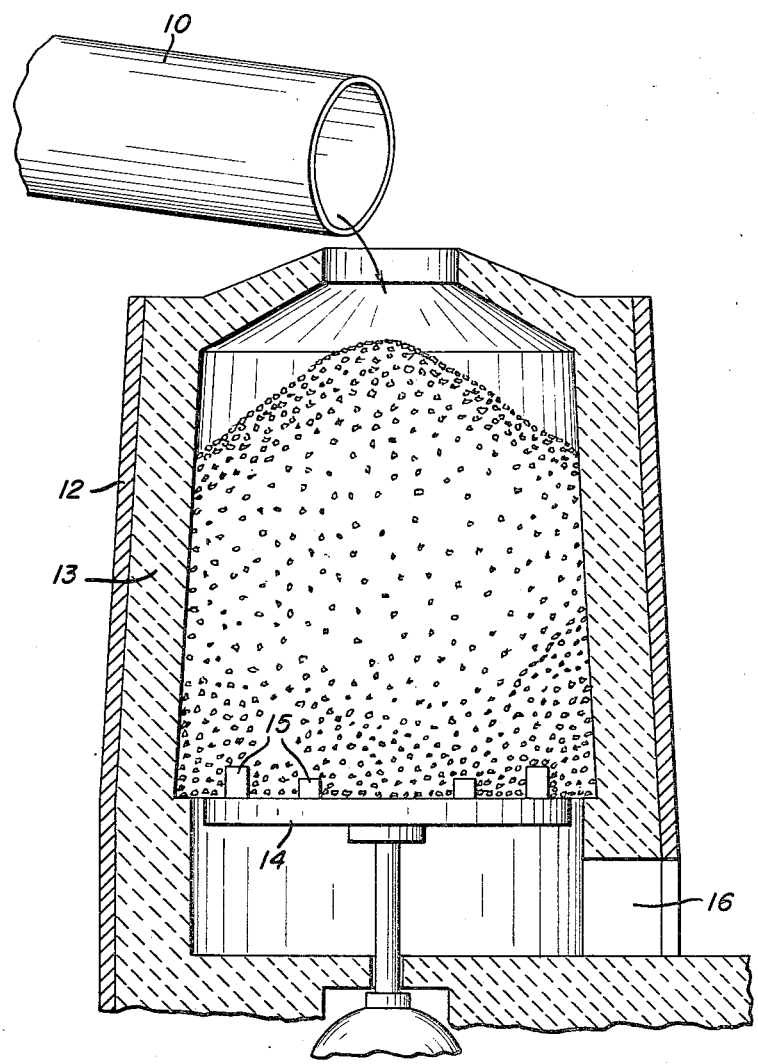

2,820,704

METHOD OF IMPROVING CHARACTERISTICS OF IRON OXIDE AGGLOMERATES

Walter C. Allen, Belleville, and Thomas F. Berry, Union City, N. J., assignors to United States Steel Corporation, a corporation of New Jersey Application January 6, 1956, Serial No. 557,769

4 Claims. (Cl. 75—5)

This invention relates to a method of improving the mechanical strength and reducibility of partially fused iron oxide agglomerates.

Before iron oxide fines can be charged to a blast furnace or open hearth, it is necessary to agglomerate them into larger masses. Although our invention is not limited to agglomerates formed by any specific process, it is especially applicable to nodules formed in a rotary kiln. Nevertheless, it is apparent our method can be used advantageously with agglomerates formed in other ways, for example by sintering. In a conventional nodulizing process iron oxide fines (for example, ore or taconite concentrate) are tumbled in a rotary kiln at high temperature, commonly 2400 to 2600° F., and they discharge as partially fused agglomerates or nodules. The usual practice is to cool these nodules rapidly in open air or even to quench them. Such nodules generally are brittle, and easily break up when handled or transported. A major constituent of many nodules is the mineral magnetite ($Fe_3O_4$) which is more difficult to reduce in a blast furnace than hematite ($Fe_2O_3$).

An object of our invention is to provide a method of improving both the mechanical strength and reducibility of partially fused agglomerates by controlling the conditions under which they cool after discharging from the agglomerating apparatus.

A more specific object is to provide a method of improving the foregoing characteristics of partially fused agglomerates by slowly cooling them under oxidizing conditions and thus both avoiding thermal shocks, as well as oxidizing much of the magnetite present to hematite.

The single figure of the drawing is a somewhat diagrammatic vertical section of one form of apparatus suitable for carrying out the method of our invention.

Our method is applicable to partially fused iron oxide agglomerates produced in any conventional way, for example nodules produced in a rotary kiln 10 illustrated in the drawing. These nodules leave the kiln at a high temperature, commonly 2400 to 2600° F. We cool the nodules to a finishing temperature of about 300–600° F. or almost to room temperature over a period of about 12 to 16 hours in a slightly oxidizing atmosphere. Although our cooling method does not rely on any specific apparatus, the apparatus illustrated comprises an open topped, upwardly tapered vertical shaft which receives nodules as they discharge from the kiln. The shaft has a metal shell 12, a refractory lining 13, and a power driven revolving grate 14 whose upper face carries upstanding lugs 15. Below this grate the side wall of the shaft has an opening 16 which serves as both an exit for cooled nodules and an air intake. The shaft has a capacity sufficient to hold 12 to 16 times the hourly output of the kiln, and a height above the grate at least as large as its diameter. For example, a kiln which discharges 7.5 tons of nodules per hour requires a shaft of 90 to 120 tons capacity or about 900 to 1200 cubic feet, assuming the nodules have a bulk density of 200 lb. per cu. ft. The shaft affords a natural updraft so that air continually circulates over the nodules as they cool. The grate breaks up any clusters and assures a uniform discharge, which is continuous once the shaft has filled.

When nodules cool over a 12 to 16 hour period in accordance with our invention, they are relatively free of thermal stresses which tend to weaken them. Our slowly cooled nodules in a diameter range of ½ to 1 inch have an average cold compressive strength of at least 700 pounds, contrasted with about 250 pounds for conventional rapidly cooled nodules. Our nodules bounce without breaking when dropped on a concrete floor from a height of five or six feet. The prolonged exposure of our nodules to an oxidizing atmosphere largely converts any magnetite therein to hematite, which is more easily reduced in a blast furnace. We have observed that some improvement in the nodules results if they are cooled slowly to only about 1200° F. under oxidizing conditions, or if cooled slowly to our preferred finishing temperature in the absence of oxidizing conditions. However for best results the slow cooling should be carried out under oxidizing conditions until a temperature of 300 to 600° F. is reached.

While we have shown and described only a single embodiment of the invention, it is apparent that modifications may arise. Therefore, we do not wish to be limited to the disclosure set forth but only by the scope of the appended claims.

We claim:

1. A method of improving the mechanical strength of partially fused iron oxide agglomerates formed at about 2400 to 2600° F. comprising cooling these agglomerates from an initial temperature approximating that at which they are formed to about 300 to 600° F. over a 12 to 16 hour period.

2. A method of improving the mechanical strength and reducibility of partially fused iron oxide agglomerates formed at about 2400 to 2600° F. comprising cooling these agglomerates from an initial temperature approximating that at which they are formed to about 300 to 600° F. over a 12 to 16 hour period and under oxidizing conditions.

3. A method of improving the mechanical strength of iron oxide nodules formed by partially fusing iron oxide fines in a rotary kiln at about 2400 to 2600° F. comprising cooling the nodules from an initial temperature approximating that at which they are formed to about 300 to 600° F. over a 12 to 16 hour period.

4. A method of improving the mechanical strength and reducibility of iron oxide nodules formed by partially fusing iron oxide fines in a rotary kiln at about 2400 to 2600° F. comprising cooling the nodules from an initial temperature approximating that at which they are formed to about 300 to 600° F. over a 12 to 16 hour period and continuously circulating air over the nodules while they are cooling.

References Cited in the file of this patent

UNITED STATES PATENTS

| 2,511,400 | De Jahn | June 13, 1950 |
| 2,533,142 | Royster | Dec. 5, 1950 |
| 2,595,574 | Grossman | May 6, 1952 |
| 2,608,481 | Royster | Aug. 26, 1952 |
| 2,676,095 | De Vaney et al. | Apr. 20, 1954 |
| 2,758,919 | De Vaney et al. | Aug. 14, 1956 |

FOREIGN PATENTS

| 623,305 | Great Britain | May 16, 1949 |